July 16, 1957  M. F. RICE  2,799,076
UNDERCUTTING ATTACHMENT FOR LATHES
Filed Jan. 5, 1954  2 Sheets-Sheet 1

Inventor
Melvin F. Rice

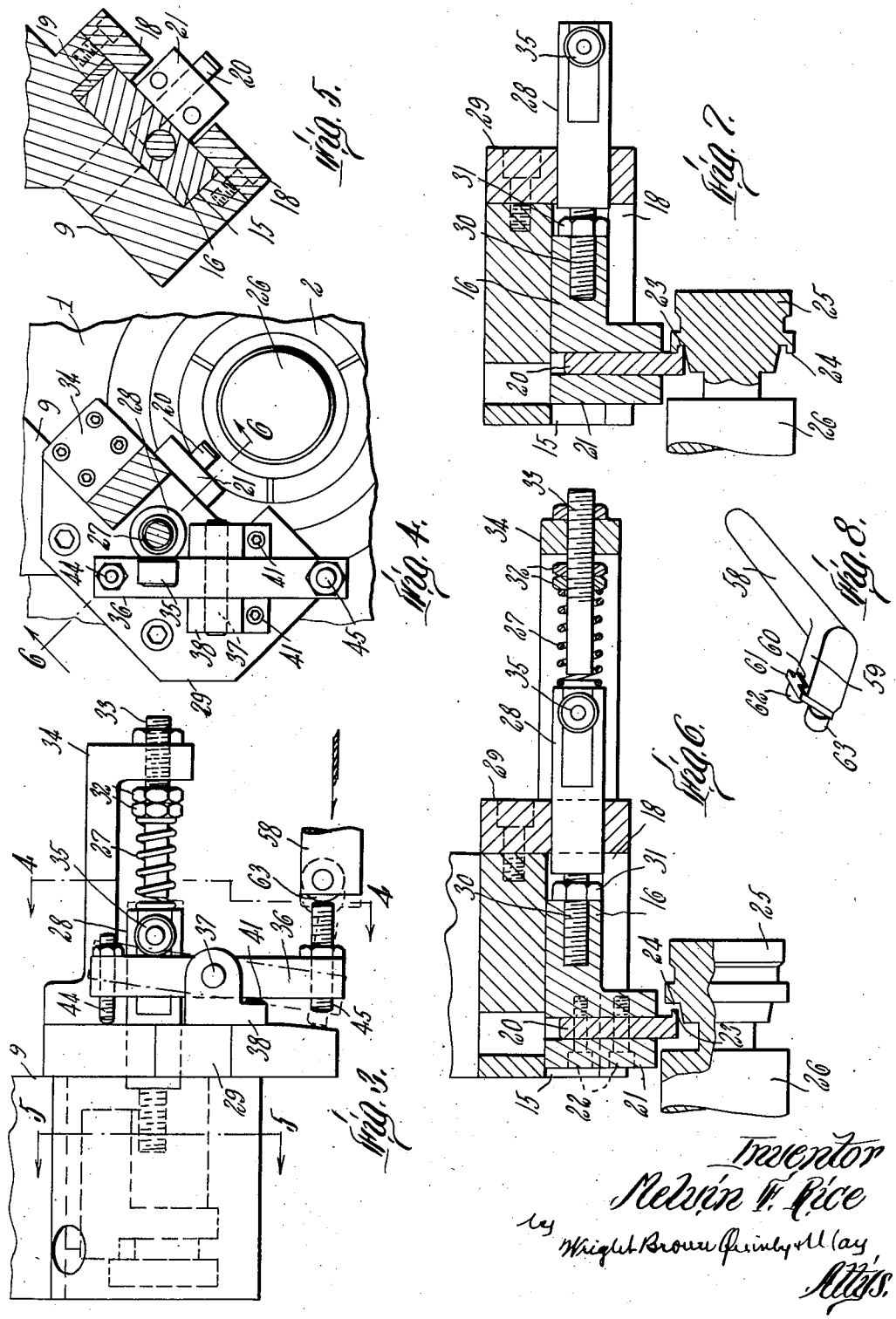

United States Patent Office 2,799,076
Patented July 16, 1957

2,799,076

UNDERCUTTING ATTACHMENT FOR LATHES

Melvin F. Rice, Claremont, N. H., assignor to Cone Automatic Machine Company Inc., Windsor, Vt., a corporation of Vermont Application January 5, 1954, Serial No. 402,343

5 Claims. (Cl. 29—57)

This invention relates to the undercutting of a work piece and has for an object to provide an attachment for this purpose for a lathe having a tool carrier movable transverse to the work axis and a tool carriage movable lengthwise of the work axis. Such a lathe, for example, may be a multiple spindle lathe of the general type shown in the Miller United States Patent No. 2,130,809, granted September 20, 1938, for Multiple Spindle Automatic Lathe.

In accordance with the present invention the tool carriage which is movable transverse to the work axis is employed to move the undercutting tool from and to a position opposite to an end portion of the work piece, while the second tool carriage which moves in the general direction of the spindle axis is employed to feed the tool against the work, and as shown herein, in a direction opposite to the direction of motion of this second tool carriage.

For a complete understanding of this invention, reference may be had to the accompanying drawings in which:

Figure 3 is a detail view to a larger scale on line 3—3 of Figure 2.

Figures 4 and 5 are detail sectional views on lines 4—4 and 5—5, respectively, of Figure 3.

Figure 6 is a detail sectional view on line 6—6 of Figure 4.

Figure 7 is a view similar to Figure 6, but showing the parts in different positions and with the undercutting tool in operation.

Figure 8 is a perspective view of one of the parts.

Figure 2:
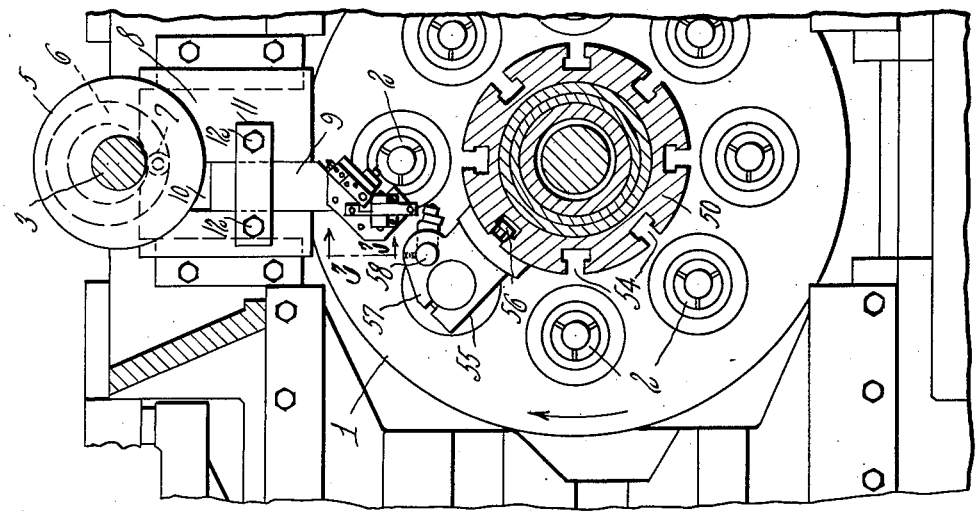
Figure 2 is a detail sectional view to a larger scale on line 2—2 of Figure 1.
Figure 1:
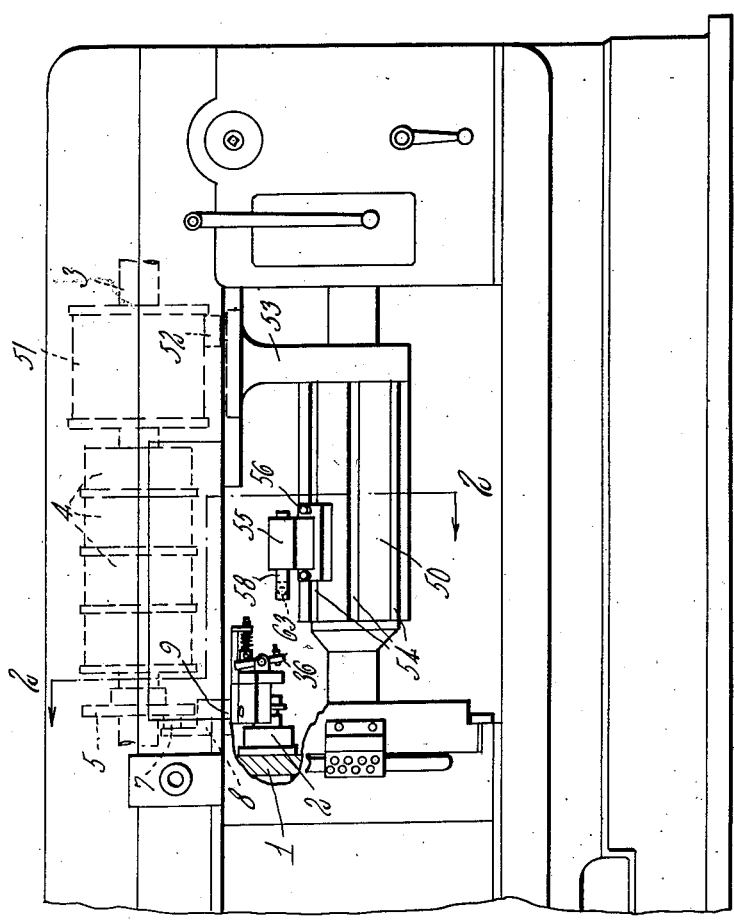
Figure 1 is a fragmentary front elevation of a multiple spindle lathe embodying the invention.

As shown in Figures 1 and 2, the undercutting attachment is applied to a multiple spindle lathe provided with an indexing work-spindle-carrying drum 1 having the rotatable work spindles 2 arranged in circular array in parallel relation therein. This drum is indexed, as is well known in the art, to bring the several work-carrying spindles successively into each index position.

Arranged above the drum 1 is a cam shaft 3 having a series of cam drums 4 having cams thereon by which various mechanisms of the machine are actuated. This cam shaft 3 also carries a cam 5 having a face groove 6 therein in which rides a cam follower 7 (see Figure 2) carried by a vertical tool carriage consisting of a slide 8. This tool slide is moved up and down from and toward the topmost spindle in the carrier 1, and in accordance with this invention, it has secured thereto a portion of the undercutting attachment. This portion comprises a main tool holder 9 which may be secured in a groove 10 in the slide 8. It may be fixed to the slide 8 as by a retaining strip 11 bridging thereacross and secured as by bolts 12 to the slide 8.

As shown best in Figures 3, 4 and 5, the member 9 is provided with a guideway 15 for the slidable reception of a second tool holder 16. Retaining strips 18 secure the tool holder 16 in position and a shim 19 of suitable thickness may be employed to hold the tool holder 16 against undue lateral play. This holder 16 carries an undercutting tool 20 which is held in position by a cover plate 21 held by screws 22 to the holder 16. The tool 20 has a cutting portion 23 which, as will later appear, will be brought in behind an end face portion 24 of a work piece 25 forming a portion of the stock 26 carried by the spindle 2 then in the uppermost index position. The holder 16 is normally held in retracted position longitudinally of the spindle as by a spring 27 engaging one end of a rod 28 slidably mounted through a cover plate 29 and having an extension 30 threaded into the holder 16 and provided with a lock nut 31 by which it may be fixed in position. The spring 27 engages at its opposite end against a pair of check nuts 32 threaded onto a stem 33 which is threaded through a bracket member 34 secured to the member 9.

The member 28 is provided with an outstanding cam follower 35 which may engage a lever 36 fulcrumed at 37 on a pair of spaced brackets 38 secured to the plate 29 as by means of screws 41. The lever 36 is permitted a limited rocking motion, the extent of which is limited by threaded stop members 44 and 45 at opposite ends which may contact with the plate 29.

It will be evident from an inspection of Figure 3 that by rocking the lever 36 from the full to the dotted line position shown, the tool cutting portion 23 will be moved away from the adjacent end of the spindle and may be caused to undercut the work as shown in Figure 7, but when the lever 36 is released, the spring 27 retracts the tool axially of the work spindle away from the work.

It will thus be seen that by motion of the slide 8, the tool may be given an in and out motion transverse to the axis of the spindle such that it may be moved from a retracted position into axial alinement with an end portion of the work piece as shown in Figures 6 and 7, whereupon by rocking the lever 36, the tool may be moved in a direction to undercut the work piece as shown in Figure 7. This cutting motion of the tool may be produced by the axial motion of a second tool carriage consisting of a slide 50 which is supported coaxially with the spindle drum 1 and is movable axially by suitable cams (not shown) on a cam drum 51 carried by the cam shaft 3. Cams on the drum 51 act upon a follower roll 52 on a slide 53 guided for motion lengthwise of the work spindles and secured to the slide 50. This slide 50 is normally employed to hold end working tools, and for this purpose it is shown in Figure 2 as provided with a plurality of longitudinally extending T slots 54 in selected ones of which the various end working tools can be secured.

For the present attachment, an actuating block 55 is secured to the slide 50 as by bolts 56 riding in one of the T slots. This member 55 is provided with a split bearing portion 57 in which may be clamped an actuating bar 58 shown detached in Figure 8. At one end of this bar it is provided with an angularly positioned extension 59 having a dovetail slot 60 therein in which may be secured a slide 61 which may be fixed in adjusted lengthwise position as by means of a bolt 62. This slide 61 carries an abutment 63, which when the holder 9 is in its inward position with the tool 23 in alinement with an end portion of the work piece, is in position to impinge upon the outer end of the threaded stop member 45 as shown in Figure 3, so that when moved in the direction of the arrow shown in this Figure, it rocks the lever 36 from the full to the dotted line position and moves the tool 20 in a direction opposite to the motion of the bar 58 and causes it to undercut the work as shown in Figure 7.

On retraction of the tool slide 50, the spring 27 returns the tool to the inoperative position shown in Figure 6, whereupon the lifting of the slide 8 by the cam 5 will withdraw the tool sufficiently far so that it will not interfere with any further desired operations including indexing of the drum 1.

From the foregoing description of an embodiment of this invention, it should be evident to those skilled in the art that various changes and modifications may be made therein without departing from its spirit or scope.

I claim:

1. In combination, a support, a rotary work-supporting spindle carried by said support, a first carriage mounted on said support for motion toward and from the axis of rotation of said spindle, a second carriage on said support mounted for motion substantially parallel to said axis, a tool carried by said first carriage in position to pass between the work piece and said support and mounted for motion relative to said first carriage, a lever pivoted to said first carriage and having one end portion operatively connected to said tool, and a member carried by said second carriage and movable therewith to engage another portion of said lever and swing said lever in a direction to move said tool into cutting relation to the work piece.

2. In combination, a support, a rotary work-supporting spindle carried by said support, a first carriage mounted on said support for motion toward and from the axis of rotation of said spindle, a second carriage on said support mounted for motion substantially parallel to said axis, a tool carried by said first carriage in position to pass between the work piece and said support and mounted for motion relative to said first carriage, a lever pivoted to said first carriage and having one end portion operatively connected to said tool, a member carried by said second carriage and movable therewith to engage another portion of said lever and swing said lever in a direction to move said tool into cutting relation to the work piece, and yielding means normally holding said tool retracted toward said support out of contact with said work piece.

3. In combination, a support, a rotary work-supporting spindle carried by said support, a first carriage mounted on said support for motion toward and from the axis of rotation of said spindle, a second carriage on said support mounted for motion substantially parallel to said axis, a tool carried by said first carriage in position to pass between the work piece and said support and mounted for motion relative to said first carriage, a lever pivoted to said first carriage and having one end portion operatively connected to said tool, a member carried by said second carriage and movable therewith to engage another portion of said lever and swing said lever in a direction to move said tool into cutting relation to the work piece, means for moving said first carriage to present said tool opposite to said work piece, and means for moving said second carriage to cause said member to impinge against said lever and press said tool against the work piece while said tool is in presenting position.

4. An undercutting attachment for a lathe having a rotary work carrying spindle, a first carriage movable toward and from the axis of rotation of said spindle, and a second carriage movable substantially parallel to the axis of said spindle, said attachment comprising a main tool holder securable to said first carriage, a second tool holder carried by said main holder and movable thereon substantially parallel to said axis, a tool carried by said second holder, a lever pivoted to said main holder and operatively related to said tool for moving said tool by rocking of said lever, and a member securable to said second carriage positioned to impinge upon said lever by motion of said second carrier to rock said lever.

5. In combination, a lathe having a spindle-carrying drum, a work-carrying rotary spindle carried by said drum, a first carriage movable transversely with respect to the axis of said spindle, a second carriage movable lengthwise of said axis, a tool holder carried by said first carriage for movement therewith toward and from said axis and movable relatively thereto lengthwise of said axis, a spring carried by said first carriage pressing said holder toward said drum, adjustable stop means limiting the movement of said holder toward said drum, other means operable by movement of said second carriage toward said drum to move said holder away from said drum against the pressure of said spring, and stop means limiting effective operation of said other means.

References Cited in the file of this patent

UNITED STATES PATENTS

| | | |
|---|---|---|
| 677,350 | Grant | July 2, 1901 |
| 1,195,293 | Towsend | Aug. 22, 1916 |
| 1,243,989 | Schulze | Oct. 23, 1917 |
| 1,291,011 | Johnsson | Jan. 14, 1919 |